United States Patent
Sulzer et al.

(10) Patent No.: US 11,824,389 B2
(45) Date of Patent: Nov. 21, 2023

(54) LOUDSPEAKER BATTERY PACK

(71) Applicant: Robert Bosch GmbH, Stuttgart (DE)

(72) Inventors: Nicholas Sulzer, Mosinee, WI (US); Shawn Filipek, Savage, MN (US); Tianbao Xie, Guang Dong (CN)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 17/697,086

(22) Filed: Mar. 17, 2022

(65) Prior Publication Data
US 2023/0299600 A1 Sep. 21, 2023

(51) Int. Cl.
*H02J 7/00* (2006.01)
*H01M 50/247* (2021.01)
*H04R 3/00* (2006.01)
*H04R 1/02* (2006.01)

(52) U.S. Cl.
CPC ......... *H02J 7/0045* (2013.01); *H01M 50/247* (2021.01); *H02J 7/0063* (2013.01); *H04R 1/025* (2013.01); *H04R 3/00* (2013.01); *H01M 2220/30* (2013.01)

(58) Field of Classification Search
CPC .... H02J 7/0045; H02J 7/0063; H01M 50/247; H01M 2220/30; H04R 1/025; H04R 3/00
See application file for complete search history.

(56) References Cited

U.S. PATENT DOCUMENTS 4,167,314 A * 9/1979 Ichiyanagi ........... G03B 17/425
  396/284
6,757,589 B1 * 6/2004 Parker ................. F16K 37/0075
  700/282

(Continued)

FOREIGN PATENT DOCUMENTS

CN 103503475 A * 1/2014 ............. H03G 3/348
WO WO-9856053 A1 * 12/1998 .......... H01M 10/125

OTHER PUBLICATIONS

Harman Audio, "JBL EON ONE Compact Battery", Product Information, <https://www.harmanaudio.com/portable-pa-speakers/JBL+EON+ONE+Compact+Battery.html>, website accessed Feb. 21, 2022, 2 pages.

*Primary Examiner* — Andrew L Sniezek
(74) *Attorney, Agent, or Firm* — Michael Best & Friedrich LLP

(57) ABSTRACT

A loudspeaker includes an enclosure defining an open front side, and an audio transducer positioned within the enclosure and configured to emit sound in a forward direction from the open front side of the enclosure. A battery receptacle is provided by the enclosure, and a removable battery pack assembly is selectively received within the battery receptacle along a longitudinal direction. The removable battery pack assembly includes a battery pack having a plurality of electrochemical cells to generate an output voltage configured to power the audio transducer. A connector at an insertion end of the battery pack electrically connects the electrochemical cells with the audio transducer. A battery door is secured with a plurality of removable fasteners to a base end of the battery pack opposite the insertion end. The battery door is further secured to the enclosure with a threaded fastener configured to be tightened parallel to the longitudinal direction.

21 Claims, 12 Drawing Sheets

(56) References Cited

U.S. PATENT DOCUMENTS

| | | | |
|---|---|---|---|
| 2015/0214760 A1* | 7/2015 | Chraime | H02J 7/0045 |
| | | | 320/103 |
| 2019/0016231 A1* | 1/2019 | Scaringe | H01M 10/613 |
| 2019/0245360 A1* | 8/2019 | Clark | H02J 7/0042 |
| 2022/0070560 A1* | 3/2022 | Lorenzen | H04R 1/023 |

* cited by examiner

LOUDSPEAKER BATTERY PACK

BACKGROUND

The present invention relates generally to the field of loudspeakers such as those used in small and large venues for public address and/or delivery of a musical performance to an audience. The present invention relates further to such loudspeakers that are configured for cordless operation by energization from a removable battery pack insertable into the loudspeaker.

SUMMARY

In one aspect, the invention provides a loudspeaker including an enclosure defining an open front side, and an audio transducer positioned within the enclosure and configured to emit sound in a forward direction from the open front side of the enclosure. A battery receptacle is provided by the enclosure, and a removable battery pack assembly is selectively received within the battery receptacle along a longitudinal direction. The removable battery pack assembly includes a battery pack having a plurality of electrochemical cells to generate an output voltage configured to power the audio transducer. A connector is provided at an insertion end of the battery pack for electrically connecting the plurality of electrochemical cells with the audio transducer. The battery pack assembly further includes a battery door secured with a plurality of removable fasteners to a base end of the battery pack opposite the insertion end. The battery door is further secured to the enclosure with a threaded fastener configured to be tightened parallel to the longitudinal direction.

In another aspect, the invention provides a loudspeaker including an enclosure defining an open front side. An audio transducer is positioned within the enclosure and configured to emit sound in a forward direction from the open front side of the enclosure. A battery receptacle is provided by the enclosure. A removable battery pack assembly is selectively received within the battery receptacle along a longitudinal direction. The removable battery pack assembly includes a battery pack having a plurality of electrochemical cells to generate an output voltage configured to power the audio transducer, and a battery door secured to the battery pack to be unitized therewith for movement with the battery pack within the battery receptacle. Plural cooperative sets of keying features between the battery receptacle and the battery pack are configured to only allow full insertion of the battery pack and securement of the battery door to the enclosure in one prescribed relative orientation. At least one of the plural cooperative sets of keying features provides an increasingly tighter fit with progressive insertion of the battery pack into the battery receptacle.

In yet another aspect, the invention provides a battery pack for selective retention into a battery receptacle of a loudspeaker, the loudspeaker having a multi-pin electrical connector, a plurality of keying features in the battery receptacle, and a plurality of threaded apertures adjacent the battery receptacle. The battery pack includes a plurality of electrochemical cells to generate an output voltage for the loudspeaker, and a plurality of keying features provided on an exterior of the battery pack and configured to mate with the plurality of keying features of the battery receptacle upon insertion of the battery pack into the battery receptacle in a longitudinal direction. A multi-pin electrical connector is provided at an insertion end of the battery pack adjacent a first one of the plurality of keying features and configured to mate with the multi-pin electrical connector of the loudspeaker. A plurality of fastener-receiving flanges are provided on the battery pack at and/or adjacent to a base end thereof opposite the insertion end.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
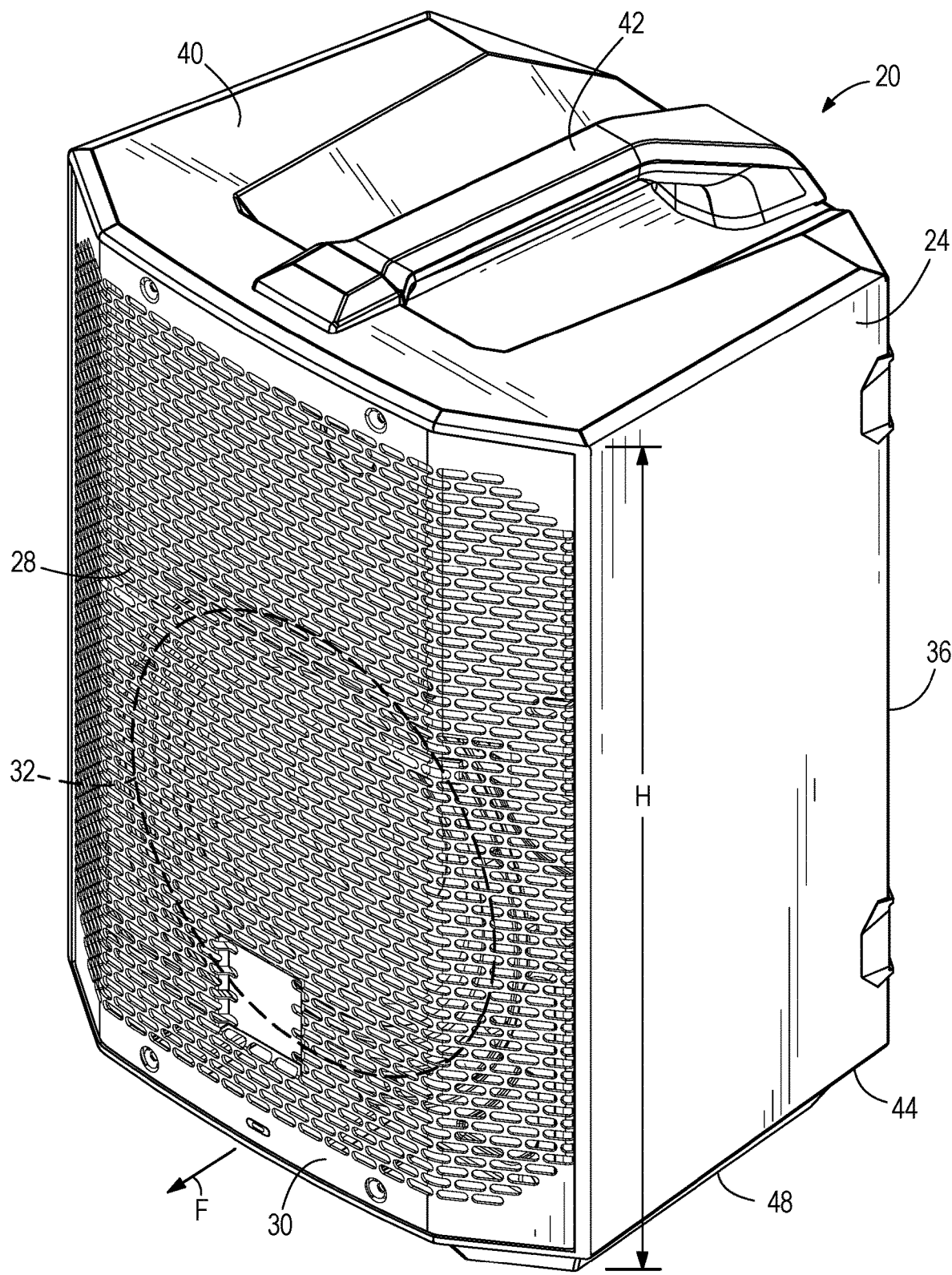
FIG. 1 is a perspective view of a loudspeaker according to one embodiment of the present disclosure.
Figure 2:
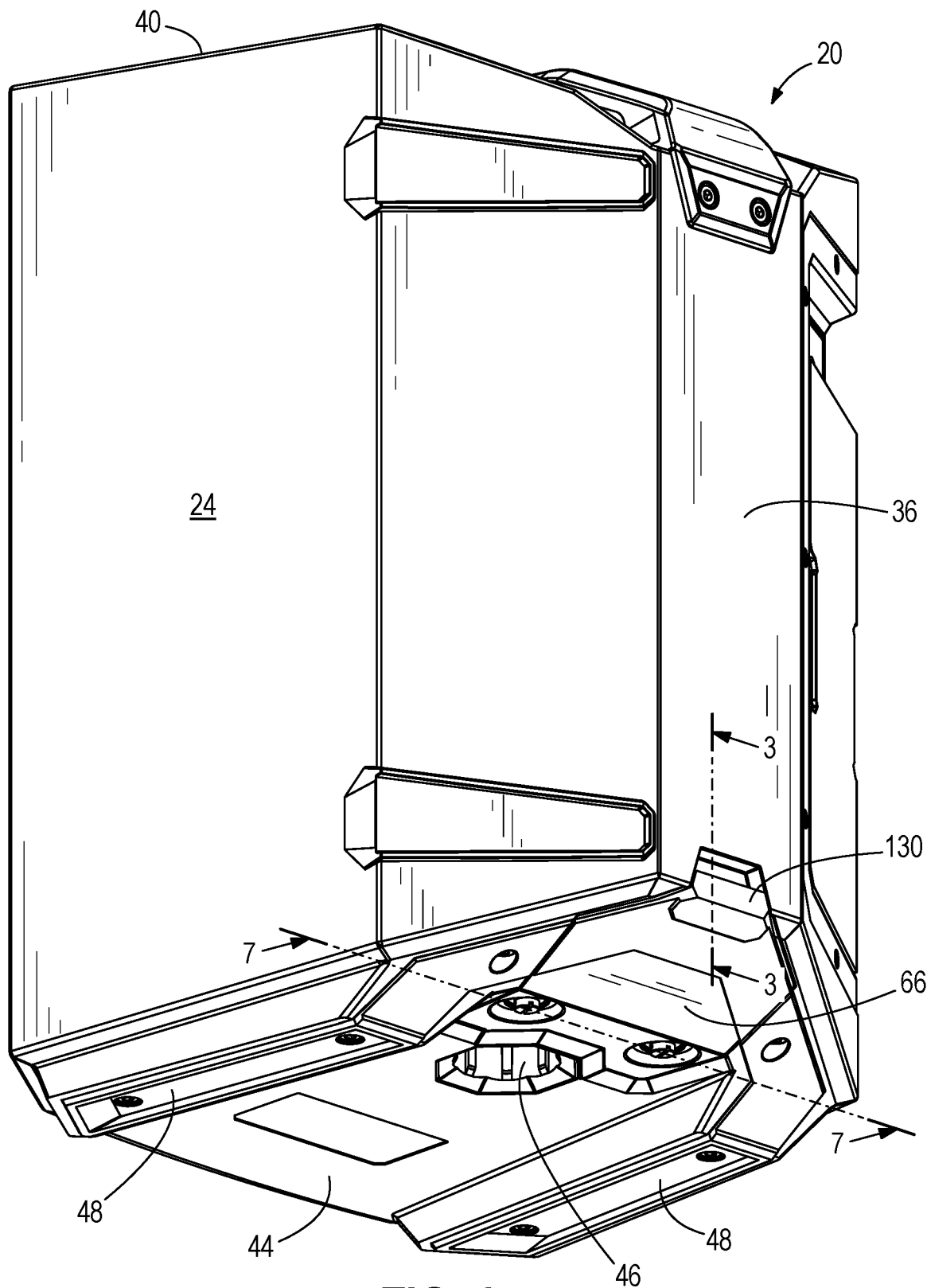
FIG. 2 is a rear perspective view of the loudspeaker of FIG. 1.

A loudspeaker 20, as shown in FIGS. 1 and 2, includes an enclosure 24 defining an outer profile of the loudspeaker 20. The loudspeaker 20 has a multi-faceted, unique outer polyhedron shape, but overall, the enclosure 24 roughly defines or is circumscribed by a rectangular prism in which the height H is the maximum dimension. Although the loudspeaker 20 can be used in a plurality of orientations, an open front side 28 defines a forward direction F. The forward direction F is perpendicular to the height H. One or more audio transducers 32 within the enclosure 24 is/are configured to emit sound from the loudspeaker's open front side 28 along the forward direction F. The front side 28 can be partially or fully covered by a foraminous grille 30. In addition to the front side 28, the loudspeaker enclosure 24 has a rear side 36 opposite the front side 28, a left side, a right side, a top side 40 with a handle 42 (FIG. 1), and a bottom side 44 including a pole mount aperture 46 and one or more foot pads 48 (FIG. 2).

Figure 3:
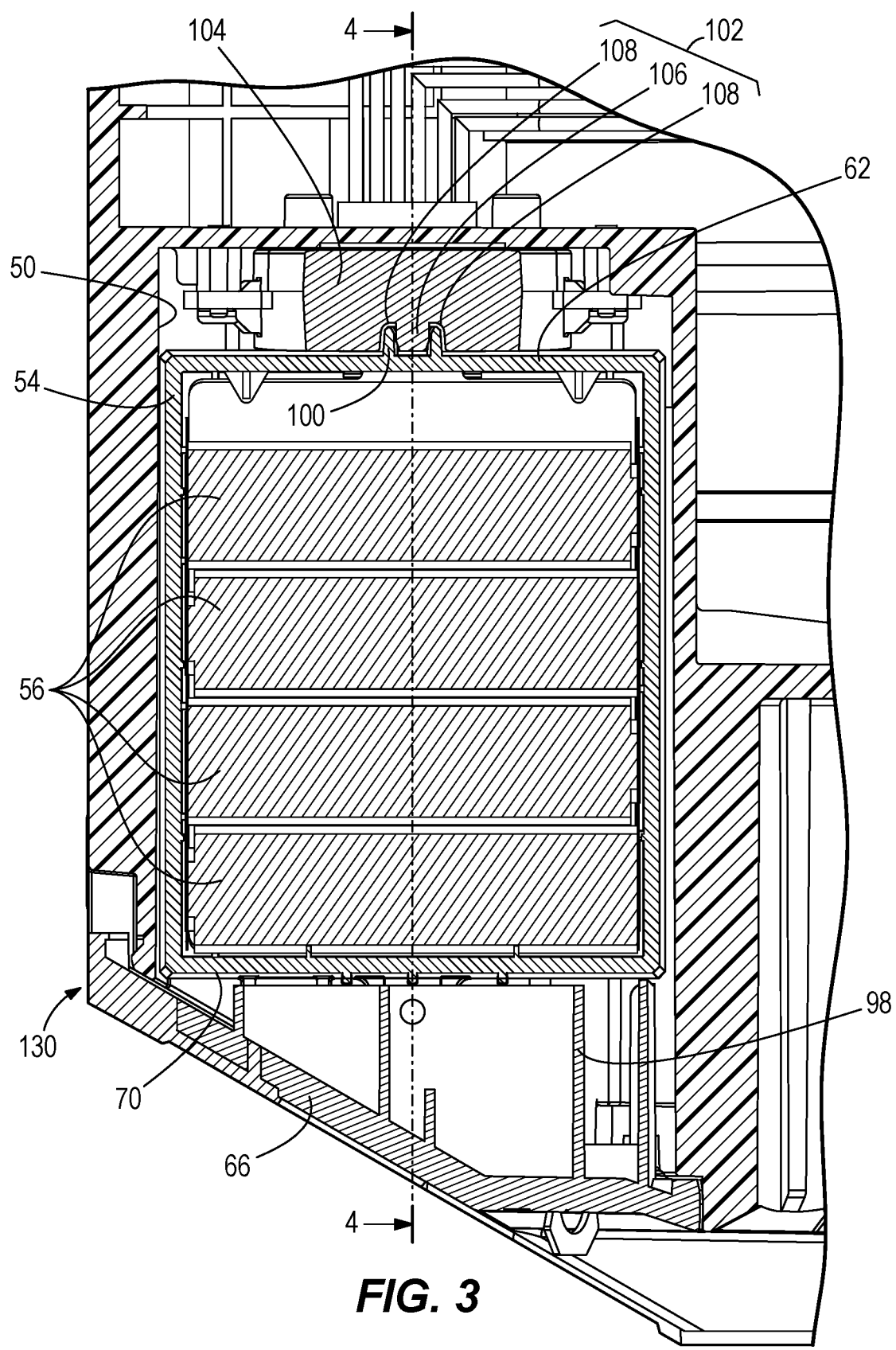
FIG. 3 is a cross-section view of a portion of the loudspeaker, taken along line 3-3 of FIG. 2 through an installed battery pack.

Although the loudspeaker 20 can, at least in some constructions, be operational by being plugged into grid power via a cord and standard wall outlet, the loudspeaker 20 is adapted to be battery powered for fully portable use without the use of grid power, cords, etc. For this purpose, the loudspeaker 20 includes a battery receptacle 50 provided by the enclosure 24. The battery receptacle 50 is located adjacent the rear side 36 and opens to the bottom side 44. As shown, the battery receptacle 50 can be located directly adjacent the pole mount aperture 46, on a rear side thereof. The loudspeaker 20 further includes a removable battery pack 54 selectively received within the battery receptacle 50 along a longitudinal direction or axis (see section line 4-4 in FIG. 3). The removable battery pack 54 includes a plurality of (e.g., rechargeable) electrochemical cells 56 (FIGS. 3, 4, 7) operable to generate an output voltage to supply electrical power for operating the loudspeaker to generate sound output according to an input signal(s) (e.g., from a remote device or sound board). The cells 56 can be series or parallel connected and can be electrically coupled with a printed circuit board 58 positioned inside a casing or housing of the battery pack 54. The battery pack 54 includes a multi-pin connector 60A provided at an insertion end 62 of the battery pack 54 as shown in at least FIGS. 4 and 8. The multi-pin connector 60A is configured to define a complementary physical and electrical interface with a multi-pin connector 60B (FIGS. 4-5) provided at an upper end wall of the battery receptacle 50.

Figure 4:
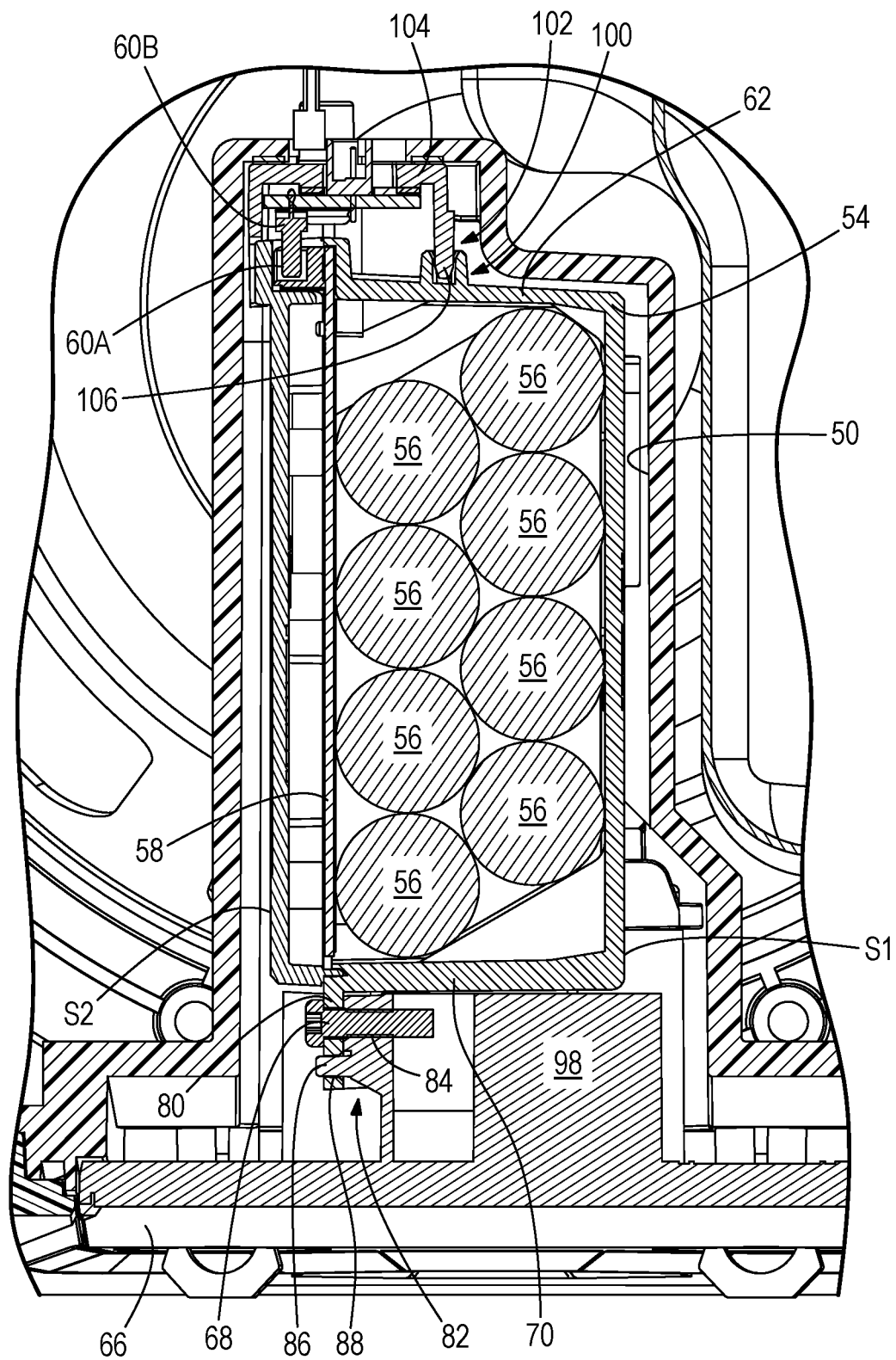
FIG. 4 is a cross-section view of a portion of the loudspeaker, taken along line 4-4 of FIG. 3 through the installed battery pack.
Figure 7:
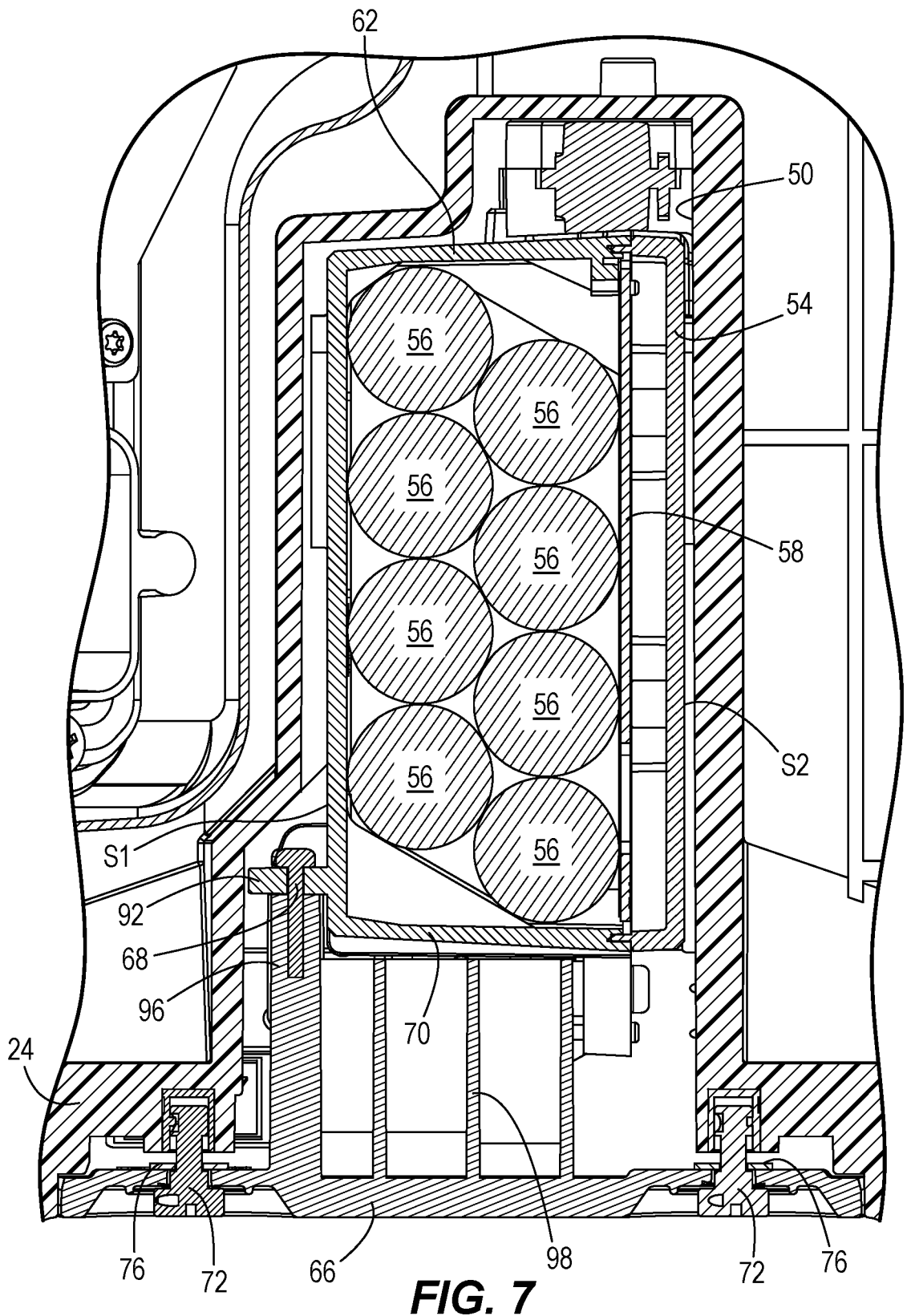
FIG. 7 is a cross-section view of a portion the loudspeaker, taken along line 7-7 of FIG. 2 through the installed battery pack.

A battery cover or door 66 is secured with removable fasteners 68 to a base end 70 of the battery pack 54 opposite the insertion end 62. When fastened together, the battery pack 54 and the battery door 66 define a unitized battery pack assembly that is insertable into the battery receptacle 50 and removable from the battery receptacle 50 as a single unit. The removable fasteners 68 can include two, three or more fasteners (e.g., screws) arranged in different orientations. As illustrated in FIG. 4, one of the fasteners 68 extends transverse to the longitudinal direction of the battery pack 54 on the base end 70 of the battery pack 54. This fastener 68 passes through a fastener-receiving flange 80 provided on the battery pack 54 to extend longitudinally from the base end 70 at a position spaced away from a first lateral side S1 of the battery pack 54 and adjacent a second opposite lateral side S2. The flange 80 mates with a connection structure 82 of the door 66, the connection structure 82 including both an opening 84 (e.g., threaded hole) to receive the fastener 68 and a locating pin 86 configured to mate with a corresponding opening 88 in the flange 80. Mating of the locating pin 86 into the opening 88 can maintain a proper orientation between the flange 80 and the connection structure 82 (and thus, between the battery pack 54 and the door 66) prior to and during assembly of the battery pack 54 with the door 66. Additionally, FIGS. 7 and 9 illustrate that the battery pack 54 includes laterally-extending flanges 92 on the first lateral side S1 of the battery pack 54 for additional fasteners 68, these fasteners 68 extending through the flanges 92 in the longitudinal direction. The flanges 92 are located adjacent the base end 70 of the battery pack 54 and are spaced apart along opposite edges of the first lateral side S1. The fasteners 68 that extend through the flanges 92 extend down past the base end 70 into engagement with connection structures 96 of the battery door 66. The connection structures 96 can include posts or bosses with threaded openings for the fasteners 68. As illustrated in FIGS. 3, 4, and 8-11, the base end 70 can be ribbed for engagement with an interior pedestal 98 of the battery door 66. As shown in FIG. 12, the pedestal 98 can be predominantly hollow. On or adjacent to the pedestal 98, the interior of the door 66 can include one or more additional locating features 98A, 98B for locating the battery pack 54 in relation thereto.

As discussed in further detail below, the battery door 66 is secured to the enclosure 24 with one or more threaded fasteners 72 configured to extend through respective battery door apertures 74 and to be tightened along the longitudinal direction of insertion of the battery pack 54 into the receptacle 50. The threaded fasteners 72 can be thumbscrews operable for tightening and loosening by hand without tools. For example, the threaded fasteners 72 can be provided at the heads thereof with a handle (e.g., a flat folding handle that can be stowed or deployed). The threaded fasteners 72 can be captive to the battery door 66. For example, as shown in FIG. 7, a clip 76 is provided on an interior side of the door 66 and configured to engage with the shank of the threaded fastener 72 to retain the threaded fastener 72 to the door 66. The clip 76 may otherwise have no effect on the function of the threaded fastener 72.

The battery receptacle 50 and the battery pack 54 each have a plurality of keying features configured to mate with each other when the battery pack 54 is presented to the battery receptacle 50 in one predefined proper orientation that allows connection of the multi-pin connectors 60A, 60B. The cooperating pairs of keying features fail to mate and may in fact prevent the full insertion of the battery pack 54 when the battery pack is presented to the battery receptacle 50 in another (e.g., backward) orientation. A first pair of the keying features includes a first keying feature 100 provided on the insertion end 62 of the battery pack 54 adjacent the multi-pin connector 60A and a first complementary keying feature 102 of the battery receptacle 50 adjacent the multi-pin connector 60B. The first battery pack keying feature 100 can be centrally located on the insertion end 62. As illustrated, the first battery pack keying feature 100 can have the shape of an open-ended boss. The boss can be generally rectangular, although it may be formed to include a small draft angle (e.g., less than 10 degrees) in the surfaces, resulting in a trapezoidal shape that is wider at the bottom and tapered toward the tip. The complementary keying feature 102 of the battery receptacle 50 can be incorporated into a shroud 104 that at least partially surrounds the multi-pin connector 60B. The keying feature 102 can be provided as a convoluted distal edge portion of the shroud 104. The keying feature 102 includes a male projection 106 portion flanked by two recesses or cutouts 108 such that the male projection portion 106 is received into the first battery pack keying feature 100 and the two cutouts 108 receive wall portions of the first battery pack keying feature 100.

Figure 6:
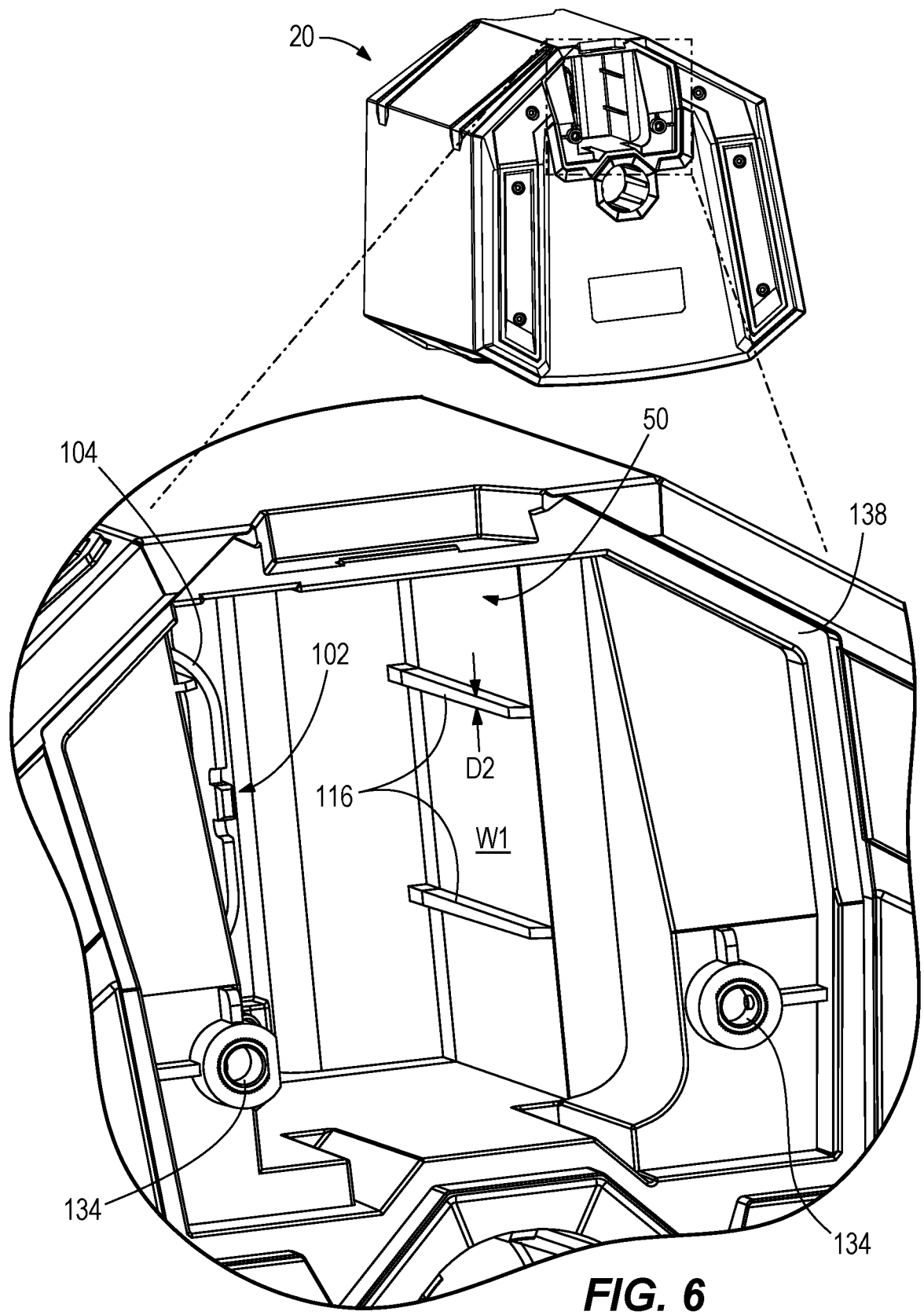
FIG. 6 is a second enlarged view showing a second side of the open battery receptacle of the loudspeaker of FIGS. 1 and 2.

Additional keying features are provided on both the first and second lateral sides S1, S2 of the battery pack 54, and the corresponding interior walls W1, W2 of the battery receptacle 50. The keying features on the first and second lateral sides S1, S2 are asymmetrically arranged with respect to one another. For example, a plane bisecting the battery pack 54 through the first keying feature 100 and the multi-pin connector 60A does not result in symmetrical battery pack halves, at leas in part due to different configurations of the keying features. Likewise, to complement the keying features on the lateral sides S1, S2 of the battery pack 54, the battery receptacle interior walls W1, W2, which directly face each other, are not symmetrical. With respect to the illustrated construction and with particular reference to FIGS. 6, 9, and 10, the first lateral side S1 of the battery pack 54 includes keying features provided as two longitudinal channels 112 configured to receive two corresponding keying features provided as ribs 116 projecting from the first interior wall W1. The channels 112 are present at least within an upper half of the battery pack 54, nearest the insertion end 62. The channels 112, each of which can be formed by upstanding ribs or walls, can have a width defined between two co-facing channel surfaces that is widest near the insertion end 62 and tapers to a smaller dimension away from the insertion end 62. Below the tapered portion, the channels 112 can each define a width dimension D1 as labeled in FIG. 9, which may remain constant along the longitudinal direction, or which may decrease with distance away from the insertion end 62. As shown in FIG. 6, each of the interior wall ribs 116 defines a width dimension D2, measured parallel to the width dimension D1 when the battery pack 54 is inserted. The rib width dimension D2 can increase with increasing depth into the battery receptacle 50 (e.g., a smooth taper from a minimum width at minimum depth to a maximum width at maximum depth). This leads to a fit between the keying features 112, 116 that becomes increasingly tighter with increasing insertion of the battery pack 54 into the receptacle 50. In some constructions, the keying features 112, 116 are configured to have no assembly clearance when the battery pack 54 is fully seated to engage the multi-pin connectors 60A, 60B and the keying features 100, 102. Thus, the keying features 112, 116 not only key the battery pack 54 for proper insertion direction but are also securement features that inhibit or prevent a loose fit which could lead to looseness, vibration, and rattling of the battery pack 54 within the battery receptacle 50. Unlike many other uses for removable battery packs, the performance and user satisfaction of the loudspeaker 20 is particularly sensitive to vibration or rattling.

It is noted that the two channels 112 are illustrated as having identical dimensions (e.g., width dimension D1), although they may be different from each other in other constructions as long as each channel 112 is configured to complement the corresponding one of the interior wall ribs 116. The channels 112 can be provided in other constructions as depressions in a housing wall of the battery pack 54, rather than upstanding ribs or walls. The channels 112 can be positioned in other locations on the battery pack 54 and can have longer or shorter longitudinal lengths—as long as they are designed to correspond properly to the interior wall ribs 116.

Figure 5:
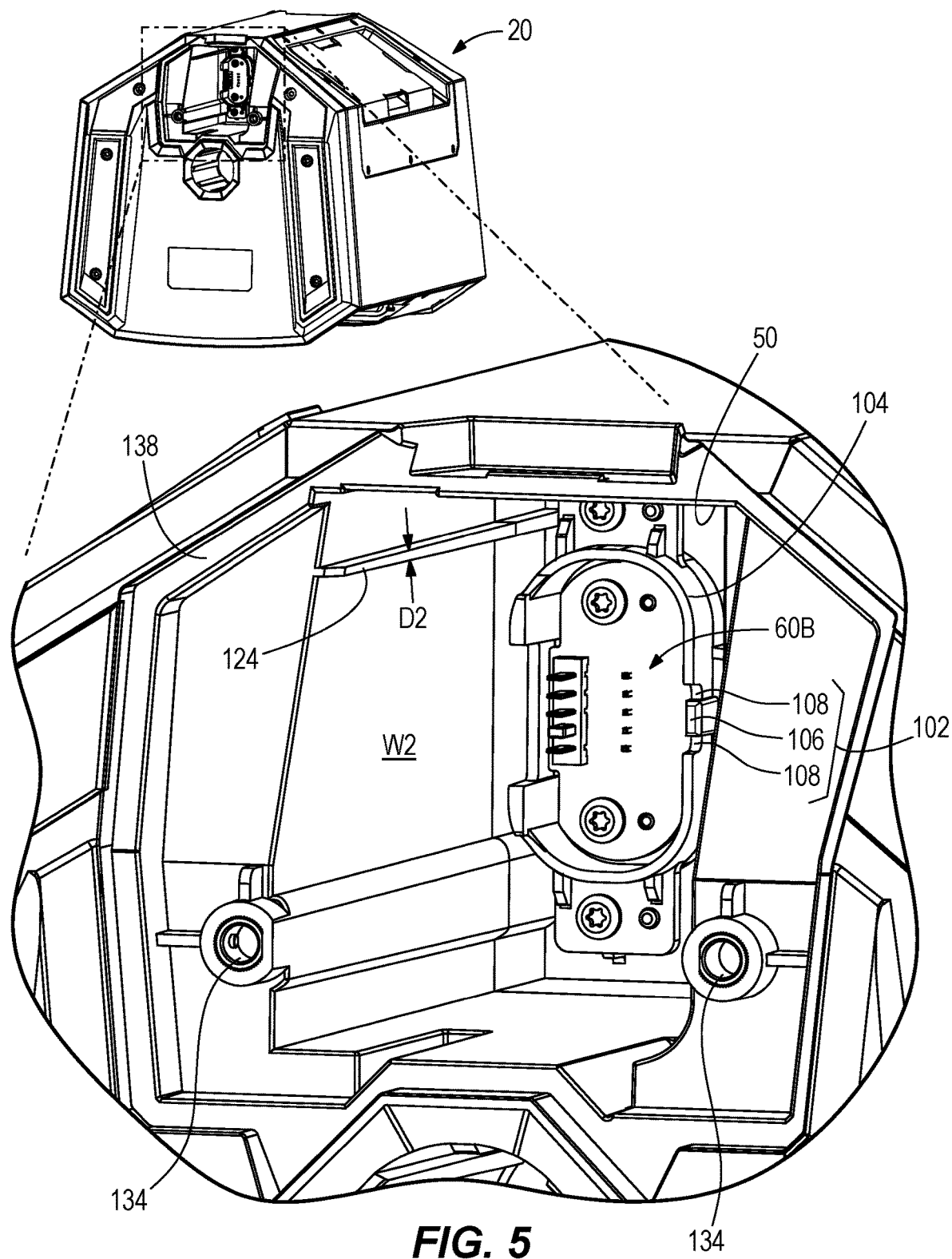
FIG. 5 is a first enlarged view showing a first side of an open battery receptacle of the loudspeaker of FIGS. 1 and 2.
Figure 8:
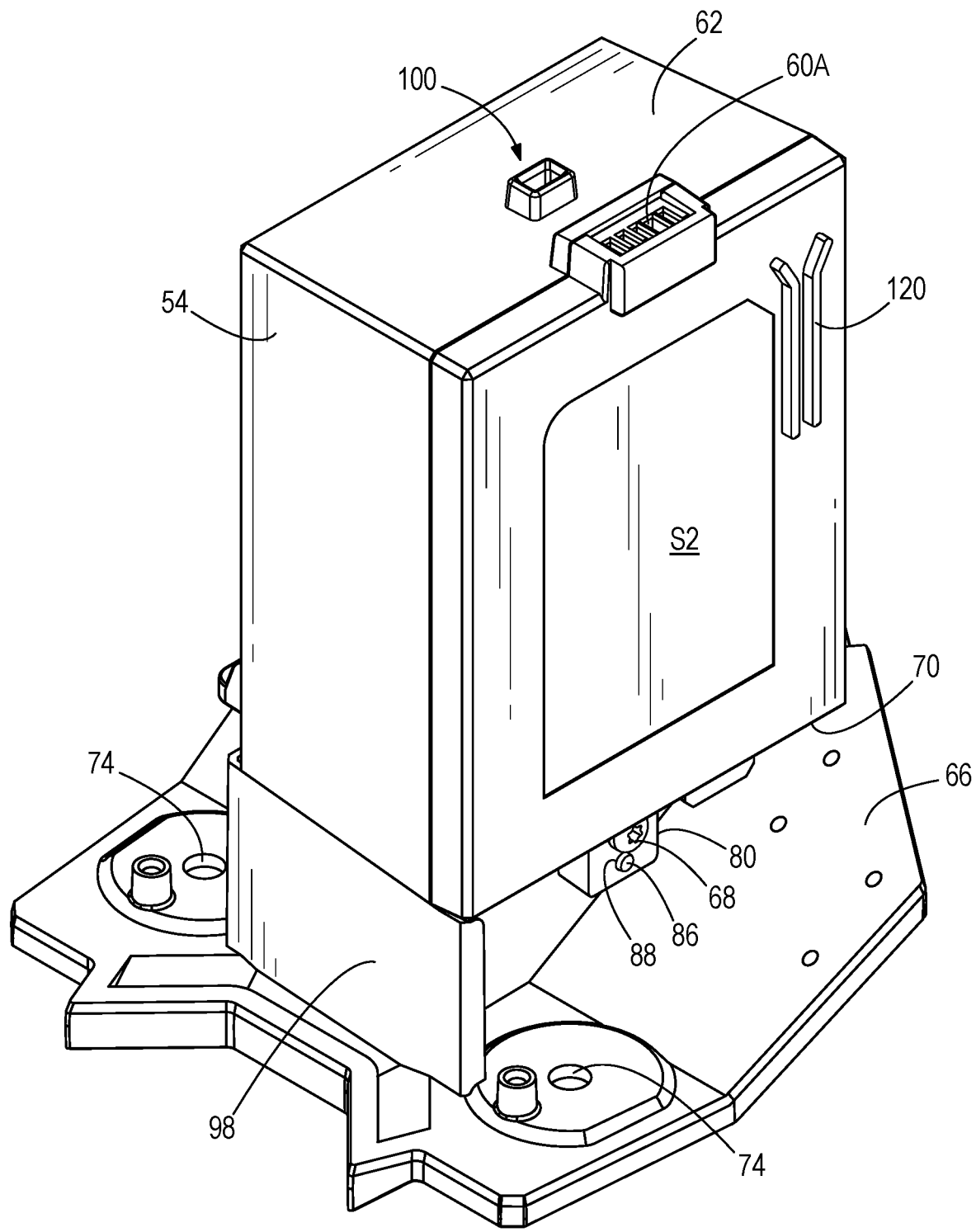
FIG. 8 is a first isolated perspective view of a battery pack assembly, removed from the loudspeaker of FIGS. 1 and 2.
Figure 9:
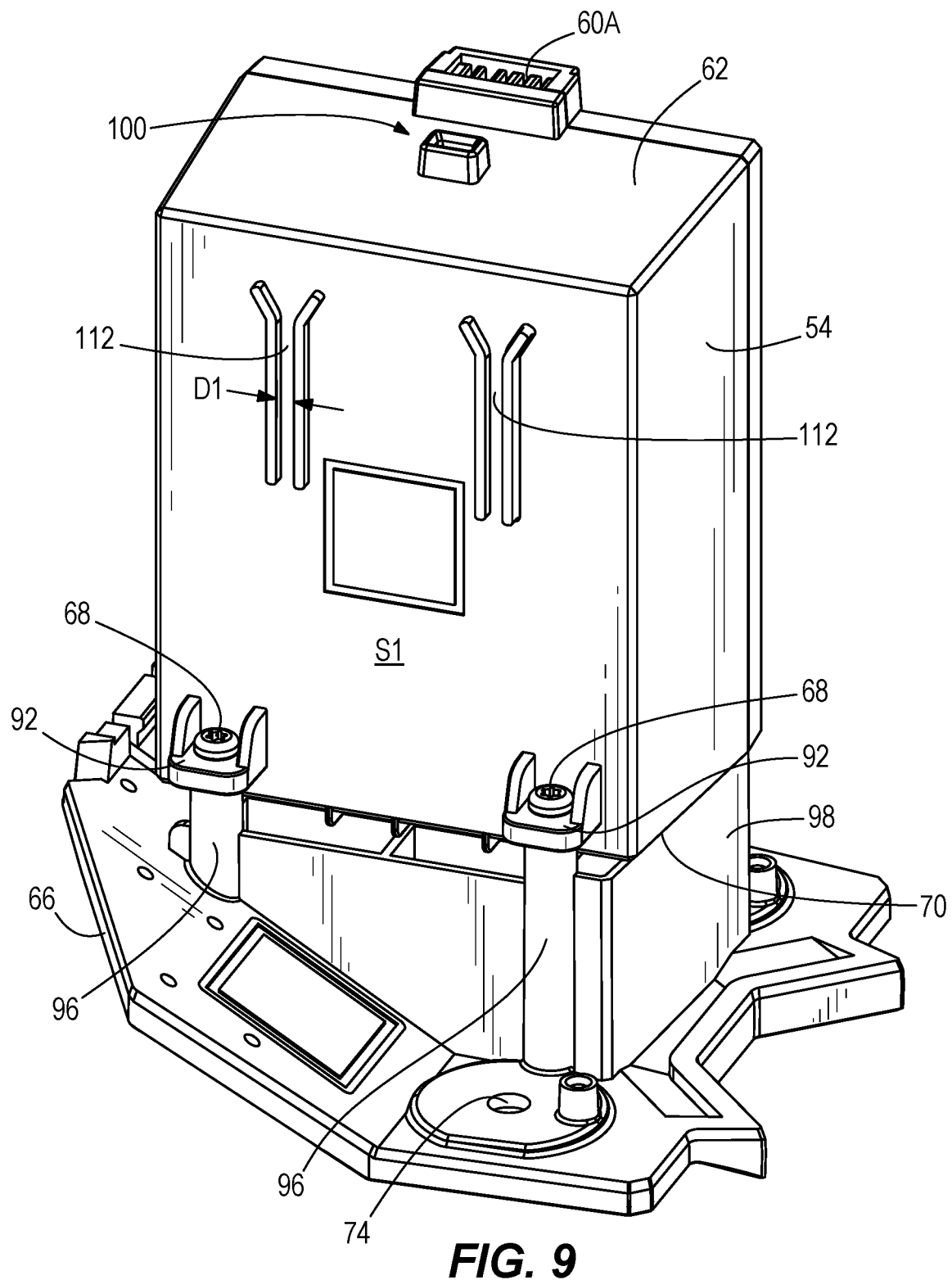
FIG. 9 is a second isolated perspective view of a battery pack assembly, removed from the loudspeaker of FIGS. 1 and 2.
Figure 10:
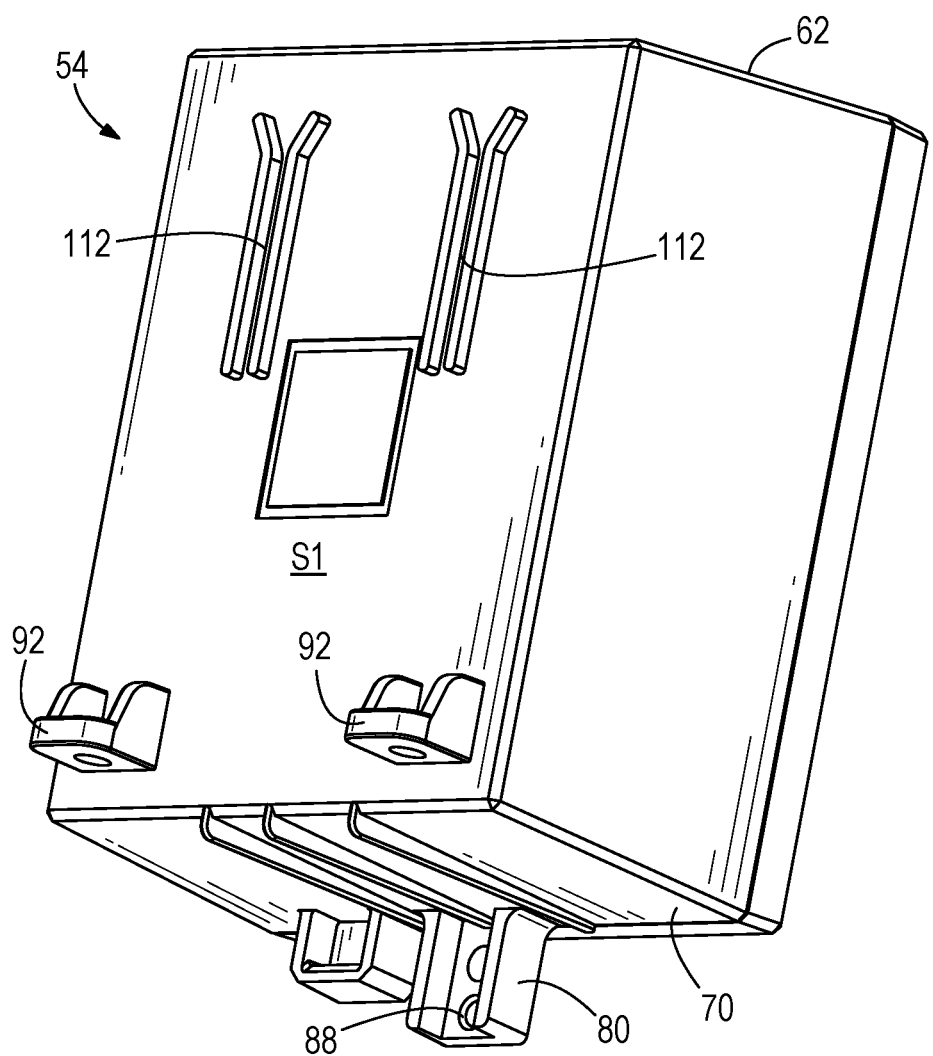
FIG. 10 is a first isolated perspective view of a battery pack, removed from the battery pack assembly of FIGS. 8 and 9.
Figure 11:
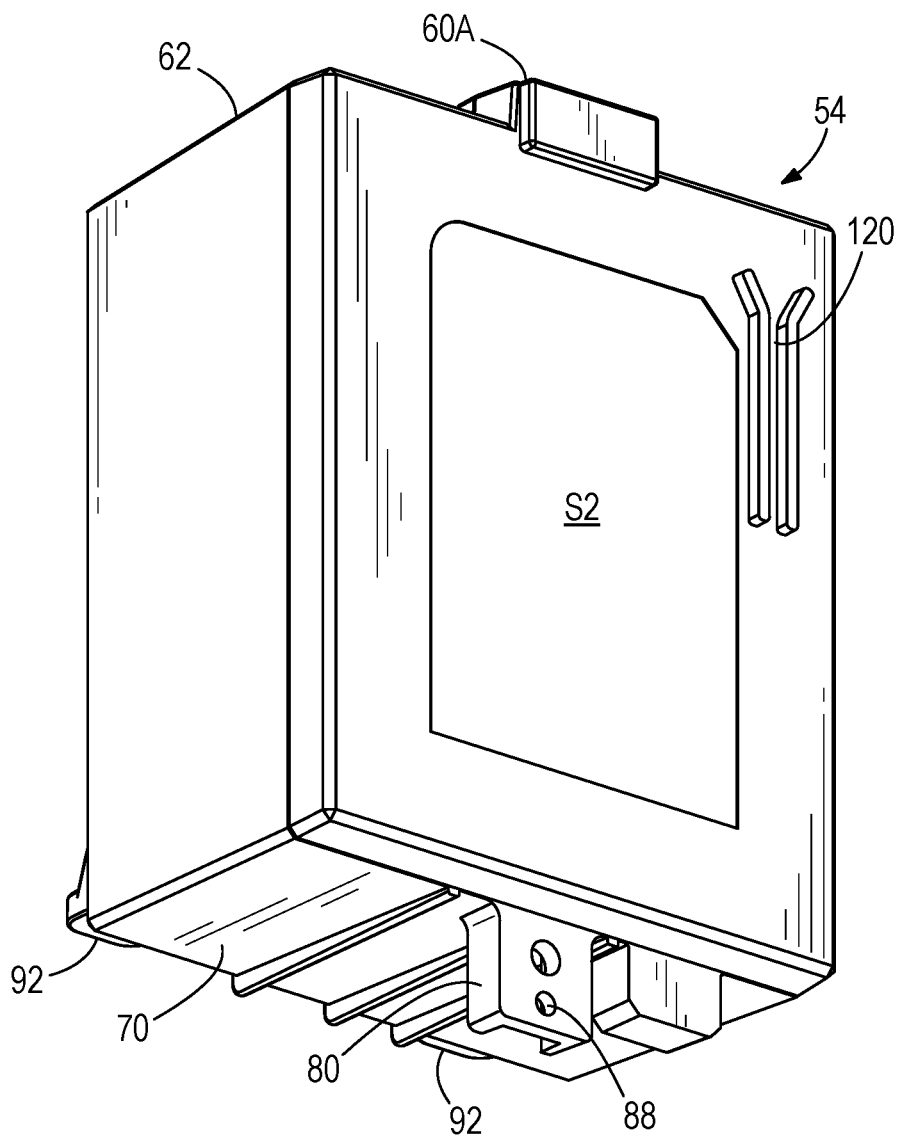
FIG. 11 is a second isolated perspective view of the battery pack, removed from the battery pack assembly of FIGS. 8 and 9.
Figure 12:
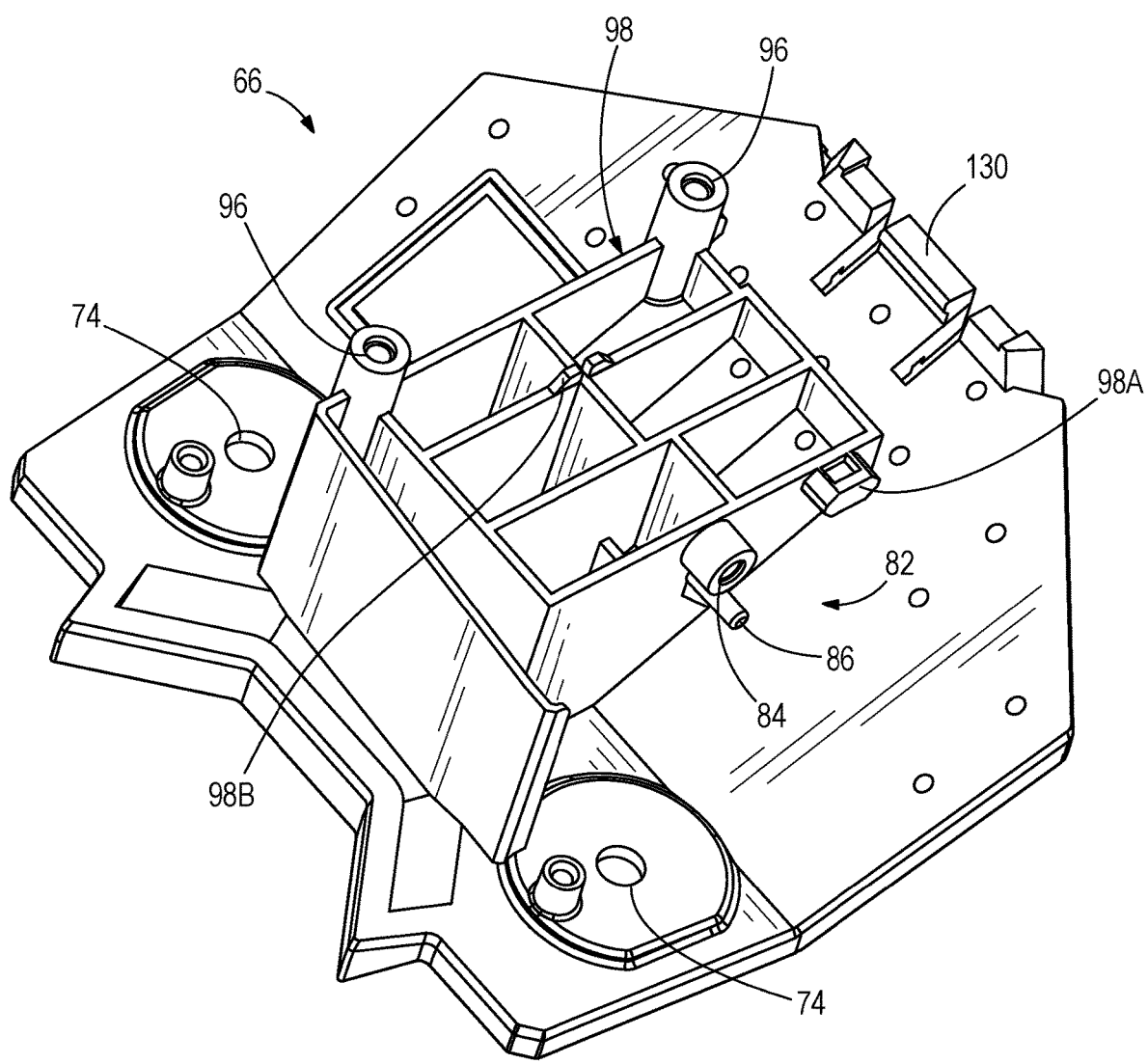
FIG. 12 is a perspective view of an interior side of a battery door of the battery pack assembly of FIGS. 8 and 9.

With respect to FIGS. 5, 8, and 11, the pair of keying features on the second lateral side S2 of the battery pack 54 and the second interior wall W2 can generally follow the features of the keying features of the first lateral side S1 and first interior wall W1. In particular, the second lateral side S2 can include a channel 120 similar to the channels 112, and the second interior wall W2 can include a rib 124 similar to the ribs 116. The channel and rib dimensions D1, D2 can be similar to the above description, to which explicit reference is made—with the understanding that the exact dimensioning of the keying features 120, 124 on the second lateral side S2 of the battery pack 54 and the second interior wall W2 can but need not match that of the keying features 112, 116 of the first lateral side S1 and first interior wall W1. It also bears mentioning that the battery pack 54 can instead be provided with one or more rib keying features to complement one or more channel keying features provided in the battery receptacle 50 in some alternate constructions.

Due to the fact that the battery pack 54 is unitized with the removable battery door 66, the battery pack 54 can be provided devoid of any latching features for engagement with the enclosure 24. In particular, the battery pack 54 is not latchable or positively securable into the battery receptacle 50, but for the engagement of the battery door 66 to the enclosure 24. Although the battery door 66 can define an elastic interference latch 130 with the enclosure 24 (FIG. 3), assembly of the battery pack assembly to the loudspeaker 20 is not reliant upon securement by the latch 130, but rather the threaded fasteners 72 (e.g., thumbscrews) that tighten the door 66 and with it the battery pack 54 along the longitudinal direction of insertion of the battery pack 54 into the receptacle 50. Further, the door 66 does not hinge on the enclosure 24 as might be the case with a battery door that merely provides access to a battery pack. For receiving the fasteners 72, the enclosure 24 includes a corresponding number of threaded apertures 134 adjacent the battery receptacle 50 as shown in FIGS. 5 and 6. The threaded apertures 134 can optionally be formed by threaded inserts pressed into the enclosure 24. Upon insertion of the assembled battery pack 54 and battery door 66 into the battery receptacle 50 in the prescribed orientation to mate the multi-pin connectors 60A, 60B and the various keying features, the latch 130 can hold the assembly in place for the subsequent securement of the fasteners 72. Tightening of these fasteners 72 increasingly tightens the door 66 to the enclosure 24, but furthermore increasingly tightens the battery pack 54 in the receptacle 50 and tightens some or all of the keying features as described above. Through tightening of the keying features, the tightening of the battery door 66 to the enclosure 24 increases the positional security of the battery pack 54 beyond merely in the longitudinal direction along which the fasteners 72 are inserted and tightened. In other words, the ability for the battery pack 54 to wobble or pivot within the receptacle 50 is reduced by the tightening of the fasteners 72. As noted above, the fasteners 72 can be tightened by grasping and rotating manually with the human hand as opposed to tools.

As can be appreciated by FIG. 2 among others, the battery door 66 has an irregular outer profile including a plurality of edges that follow contours of the enclosure 24. The latch 130 can be arranged at the rear side 36. Likewise, a portion of the battery door 66 can wrap at least partially around the bottom pole mount 46 (see FIGS. 5 and 6). The outer profile of the battery door 66 can be received within a shallow depression forming a shoulder or ledge 138 that bounds the battery receptacle 50. The threaded apertures 134 for the battery door fasteners 72 can be positioned in an intermediate depression 142 situated between the ledge 138 and the battery receptacle 50.

Various features of the invention are set forth in the claims below.

What is claimed is:
1. A loudspeaker comprising:
an enclosure defining an open front side;
an audio transducer positioned within the enclosure and configured to emit sound in a forward direction from the open front side of the enclosure;
a battery receptacle provided by the enclosure; and
a removable battery pack assembly selectively received within the battery receptacle along a longitudinal direction, wherein the removable battery pack assembly includes
a battery pack having a plurality of electrochemical cells to generate an output voltage configured to power the audio transducer,
a connector provided at an insertion end of the battery pack for electrically connecting the plurality of electrochemical cells with the audio transducer, and a battery door secured with a plurality of removable fasteners to a base end of the battery pack opposite the insertion end, the battery door further secured to the enclosure with a threaded fastener configured to be tightened parallel to the longitudinal direction.

2. The loudspeaker of claim 1, wherein the threaded fastener is held captive on the battery pack door by a retaining clip.

3. The loudspeaker of claim 1, wherein the threaded fastener is a first threaded fastener, the loudspeaker further comprising a second threaded fastener configured to be tightened parallel to the longitudinal direction.

4. The loudspeaker of claim 1, wherein the battery receptacle is provided on the bottom side of the enclosure such that the longitudinal direction is parallel to a height direction of the loudspeaker.

5. The loudspeaker of claim 1, wherein the plurality of removable fasteners securing the battery door to the base end of the battery pack includes fasteners extending in different directions, including both parallel to the longitudinal direction and perpendicular to the longitudinal direction.

6. The loudspeaker of claim 1, further comprising plural cooperative sets of keying features between the battery receptacle and the battery pack configured to only allow full insertion of the battery pack and securement of the battery door to the enclosure in one prescribed relative orientation.

7. The loudspeaker of claim 6, wherein at least one of the plural cooperative sets of keying features provides an increasingly tighter fit with progressive insertion of the battery pack into the battery receptacle.

8. The loudspeaker of claim 6, wherein the plural cooperative sets of keying features include first and second longitudinal channels on a first lateral side of the battery pack, a third longitudinal channel on a second opposite lateral side of the battery pack, and an open-ended boss on the insertion end adjacent the connector.

9. A loudspeaker comprising:
an enclosure defining an open front side;
an audio transducer positioned within the enclosure and configured to emit sound in a forward direction from the open front side of the enclosure;
a battery receptacle provided by the enclosure;
a removable battery pack assembly selectively received within the battery receptacle along a longitudinal direction, wherein the removable battery pack assembly includes
a battery pack having a plurality of electrochemical cells to generate an output voltage configured to power the audio transducer, and
a battery door secured to the battery pack to be unitized therewith for movement with the battery pack within the battery receptacle; and
plural cooperative sets of keying features between the battery receptacle and the battery pack configured to only allow full insertion of the battery pack and securement of the battery door to the enclosure in one prescribed relative orientation,
wherein at least one of the plural cooperative sets of keying features provides an increasingly tighter fit with progressive insertion of the battery pack along the longitudinal direction into the battery receptacle.

10. The loudspeaker of claim 9, wherein the battery door is securable to the enclosure with at least one threaded fastener that tightens parallel to the longitudinal direction.

11. The loudspeaker of claim 9, wherein the battery door is secured to the battery pack by a plurality of fasteners extending in different directions, including both parallel to the longitudinal direction and perpendicular to the longitudinal direction.

12. The loudspeaker of claim 11, wherein the plurality of fasteners securing the battery door to the battery pack are positioned at or adjacent to a base end of the battery pack, the base end being opposite an insertion end of the battery pack.

13. The loudspeaker of claim 9, wherein the battery receptacle is provided on the bottom side of the enclosure such that the longitudinal direction is parallel to a height direction of the loudspeaker.

14. The loudspeaker of claim 9, wherein the battery pack includes a connector configured to establish electrical communication with the audio transducer, the connector provided at an insertion end of the battery pack adjacent a keying feature of the plural cooperative sets of keying features.

15. A battery pack for selective retention into a battery receptacle of a loudspeaker, the loudspeaker having a multi-pin electrical connector, a plurality of keying features in the battery receptacle, and a plurality of threaded apertures adjacent the battery receptacle, the battery pack comprising:
a plurality of electrochemical cells to generate an output voltage for the loudspeaker;
a plurality of keying features provided on an exterior of the battery pack and configured to mate with the plurality of keying features of the battery receptacle upon insertion of the battery pack into the battery receptacle in a longitudinal direction;
a multi-pin electrical connector provided at an insertion end of the battery pack adjacent a first one of the plurality of keying features and configured to mate with the multi-pin electrical connector of the loudspeaker;
a plurality of fastener-receiving flanges provided on the battery pack at and/or adjacent to a base end thereof opposite the insertion end; and
wherein the plurality of keying features includes a keying feature centrally provided on the insertion end of the battery pack adjacent the multi-pin electrical connector of the battery pack.

16. A battery pack assembly including the battery pack of claim 15 and a battery door secured with removable fasteners to the plurality of fastener-receiving flanges of the battery pack such that the battery door is unitized with the battery pack and removable with the battery pack upon removal of the battery pack from the battery receptacle of the loudspeaker.

17. The battery pack assembly of claim 16, wherein the removable fasteners extend in different directions, including parallel to the longitudinal direction and perpendicular to the longitudinal direction.

18. The battery pack assembly of claim 17, wherein the removable fasteners include a pair of threaded fasteners extending parallel to the longitudinal direction on a lateral side of the battery pack, and a threaded fastener extending perpendicular to the longitudinal direction on the base end of the battery pack.

19. The battery pack of claim 15, wherein the plurality of fastener-receiving flanges provided on the battery pack includes a pair of laterally-extending flanges on a first lateral side of the battery pack, and a flange extending parallel to the longitudinal direction from the base end at a position spaced away from the first lateral side.

20. The battery pack of claim 19, wherein the first lateral side of the battery pack has two of the plurality of keying features provided as longitudinal channels, and wherein a second lateral side of the battery pack opposite the first lateral side has a single one of the plurality of keying features provided as a longitudinal channel.

21. A battery pack for selective retention into a battery receptacle of a loudspeaker, the loudspeaker having a multi-pin electrical connector, a plurality of keying features in the battery receptacle, and a plurality of threaded apertures adjacent the battery receptacle, the battery pack comprising:
- a plurality of electrochemical cells to generate an output voltage for the loudspeaker;
- a plurality of keying features provided on an exterior of the battery pack and configured to mate with the plurality of keying features of the battery receptacle upon insertion of the battery pack into the battery receptacle in a longitudinal direction;
- a multi-pin electrical connector provided at an insertion end of the battery pack adjacent a first one of the plurality of keying features and configured to mate with the multi-pin electrical connector of the loudspeaker; and
- a plurality of fastener-receiving flanges provided on the battery pack at and/or adjacent to a base end thereof opposite the insertion end,
wherein the plurality of fastener-receiving flanges provided on the battery pack includes a pair of laterally-extending flanges on a first lateral side of the battery pack, and a flange extending parallel to the longitudinal direction from the base end at a position spaced away from the first lateral side,
wherein the first lateral side of the battery pack has two of the plurality of keying features provided as longitudinal channels, and wherein a second lateral side of the battery pack opposite the first lateral side has a single one of the plurality of keying features provided as a longitudinal channel.

* * * * *